(12) United States Patent
Sajassi et al.

(10) Patent No.: US 8,644,134 B2
(45) Date of Patent: Feb. 4, 2014

(54) DUAL-HOMING FOR ETHERNET LINE SERVICES

(75) Inventors: Ali Sajassi, San Ramon, CA (US); Samer M. Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 474 days.

(21) Appl. No.: 12/914,722

(22) Filed: Oct. 28, 2010

(65) Prior Publication Data

US 2012/0106360 A1     May 3, 2012

(51) Int. Cl.
*G01R 31/08*     (2006.01)

(52) U.S. Cl.
USPC ........... 370/224; 370/222; 370/223; 370/258; 370/395.53; 370/403; 370/404; 370/405; 370/406; 370/424; 370/452; 370/460; 370/909

(58) Field of Classification Search
USPC ............ 370/222, 223, 224, 258, 395.53, 403, 370/404, 405, 406, 424, 452, 460, 909
See application file for complete search history.

(56) References Cited

U.S. PATENT DOCUMENTS

| | | | |
|---|---|---|---|
| 6,766,482 B1 * | 7/2004 | Yip et al. .................. | 714/717 |
| 6,813,250 B1 * | 11/2004 | Fine et al. ................. | 370/256 |
| 2012/0224471 A1 * | 9/2012 | Vinod et al. .............. | 370/222 |

FOREIGN PATENT DOCUMENTS

WO     2011021179 A1     2/2011

OTHER PUBLICATIONS

Ryoo et al., Ethernet Ring Protection for Carrier Ethernet Networks, IEEE Sep. 2008.*
G.8032 Ethernet Ring Protection Overview, Mar. 2008.*
ITU-T G.8032/Y.1344, Mar. 2012, form Applicant's IDS filed on Mar. 7, 2012.*
Sajassi et al., Requirements for Ethernet VPN (E-VPN), Oct. 17, 2010, form Applicant's IDS filed on Mar. 7, 2012.*
Sajassi, et al. "Requirements for Ethernet VPN (E-VPN), draft-sajassi-raggarwa-12vpn-evpn-req-00.txt," Internet Engineering Task Force (IETF), Oct. 17, 2010, pp. 1-12, Standard Working Draft, Internet Society (ISOC), Geneva, Switzerland.
"Ethernet ring protection switching," ITU-T Standard, International Telecommunication Union, pp. 1-98, Mar. 9, 2010, Geneva, Switzerland.
International search report and written opinion for application No. PCT/US2011/057871 dated Feb. 7, 2012.

* cited by examiner

*Primary Examiner* — Mark Rinehart
*Assistant Examiner* — Mang Yeung
(74) *Attorney, Agent, or Firm* — Patterson & Sheridan LLP

(57) ABSTRACT

Techniques are described which provide mechanisms for dual-homing an access ring for virtual private wire service (VPWS) Ethernet line (E-Line) services. The mechanism may provide resiliency against access ring failures and offer a restoration time of 50 msec upon failure. A method to provide such resiliency may generally include determining, at a first ring port of an access node, a ring failure in an Ethernet ring. Upon determining the first ring port of the access node is not situated on a same side of the Ethernet ring as a node designated as a ring protection link (RPL) owner, a message is transmitted on a second ring port of the access node towards a provider edge (PE) node. The message is used to activate pseudowires (PWs) at the PE node for virtual local area networks (VLANs) of the access node.

18 Claims, 7 Drawing Sheets

DUAL-HOMING FOR ETHERNET LINE SERVICES

TECHNICAL FIELD

Embodiments presented in this disclosure generally relate to computer networking, and more particularly, to dual-homing an access ring for virtual private wire service (VPWS) Ethernet line (E-Line) services.

BACKGROUND

Service providers (SPs) are seeking to replace their synchronous optical networking (SONET) gear. Traditionally, the current widely adopted solution for offering access ring dual-homing for Ethernet line (E-Line) services involves configuring a service using virtual private LAN service (VPLS) on provider edge (PE) nodes. This ensures that both PE nodes terminating the access ring are meshed with remote PE node(s) and ready for forwarding upon any failure. This solution, however, has several shortcomings. First, this approach has scalability implications, as a bridge-domain may be required on the PE node for every point-to-point (p2p) service. A majority of platforms are not capable of scaling bridge-domains as high as the number of p2p services required in many cases. Second, media access control (MAC) address learning may be required even though the service is p2p, hence wasting platform resources. Third, flooded traffic (unknown unicast, broadcast, and multicast) may be delivered from the core to both PE nodes, only to have one of the two copies be dropped at the port that is blocking on the ring.

Another solution is to use a virtual private wire service (VPWS) on the PE nodes complemented with multiple VLAN registration protocol (MVRP) (IEEE 802.1ak) running on all the access ring switches, as well as the PE nodes. The disadvantage of this mechanism is that MVRP (and MRP in general) use a 'stop and forward' paradigm, where the MVRP messages need to be stopped and processed by the switch control plane on a hop-by-hop basis upon failure. Therefore, with this solution it is unlikely to be possible to meet the key 50 msec failover time requirement.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments disclosed herein provide methods, systems, and computer program products for dual-homing a G.8032 access ring for virtual private wire service (VPWS) Ethernet line (E-Line) services. One embodiment generally includes determining, at a first ring port of an access node, a ring failure in an Ethernet ring. Upon determining the first ring port of the access node is not situated on a same side of the Ethernet ring as a node designated as a ring protection link (RPL) owner, a message is transmitted on a second ring port of the access node towards a provider edge (PE) node. The message is used to activate pseudowires (PWs) at the PE node for virtual local area networks (VLANs) of the access node.

Another embodiment includes a switching device. The switching device may generally include at least a processor and a memory storing an application configured to perform an operation for processing network data, the operation comprising determining, at a first ring port of the switching device, a ring failure in an Ethernet ring and upon determining the first ring port of the switching device is not situated on a same side of the Ethernet ring as a node designated as a ring protection link (RPL) owner, transmitting a message on a second ring port of the switching device towards a provider edge (PE) node for activating pseudowires (PWs) at the PE node for virtual local area networks (VLANs) of the switching device.

Description of Example Embodiments

Service providers (SPs) seeking to replace their synchronous optical networking (SONET) gear are adopting ITU-T G.8032 as an alternative technology that offers 50 msec protection over Ethernet rings. For some embodiments, G.8032 access rings may be dual-homed into a pair of layer 2 virtual private network (L2VPN) provider edge (PE) nodes offering Ethernet line (E-Line) services over multiprotocol label switching (MPLS) transport (i.e., virtual private wire service (VPWS)). First, dual-homing G.8032 access rings into a pair of L2VPN PE nodes may provide resiliency against access ring failures (e.g., failure of any access node, ring port or ring link). Second, dual-homing may provide resiliency against failure of PE node or ring-facing attachment circuit. Third, dual-homing may integrate and inter-work with pseudowire (PW) redundancy mechanisms (e.g., both 1-way and 2-way PW redundancy). Fourth, dual-homing may offer a restoration time of 50 msec upon failure. Dual-homing G.8032 access rings into a pair of L2VPN PE nodes may displace SONET while maintaining similar protection characteristics.

Figure 1:
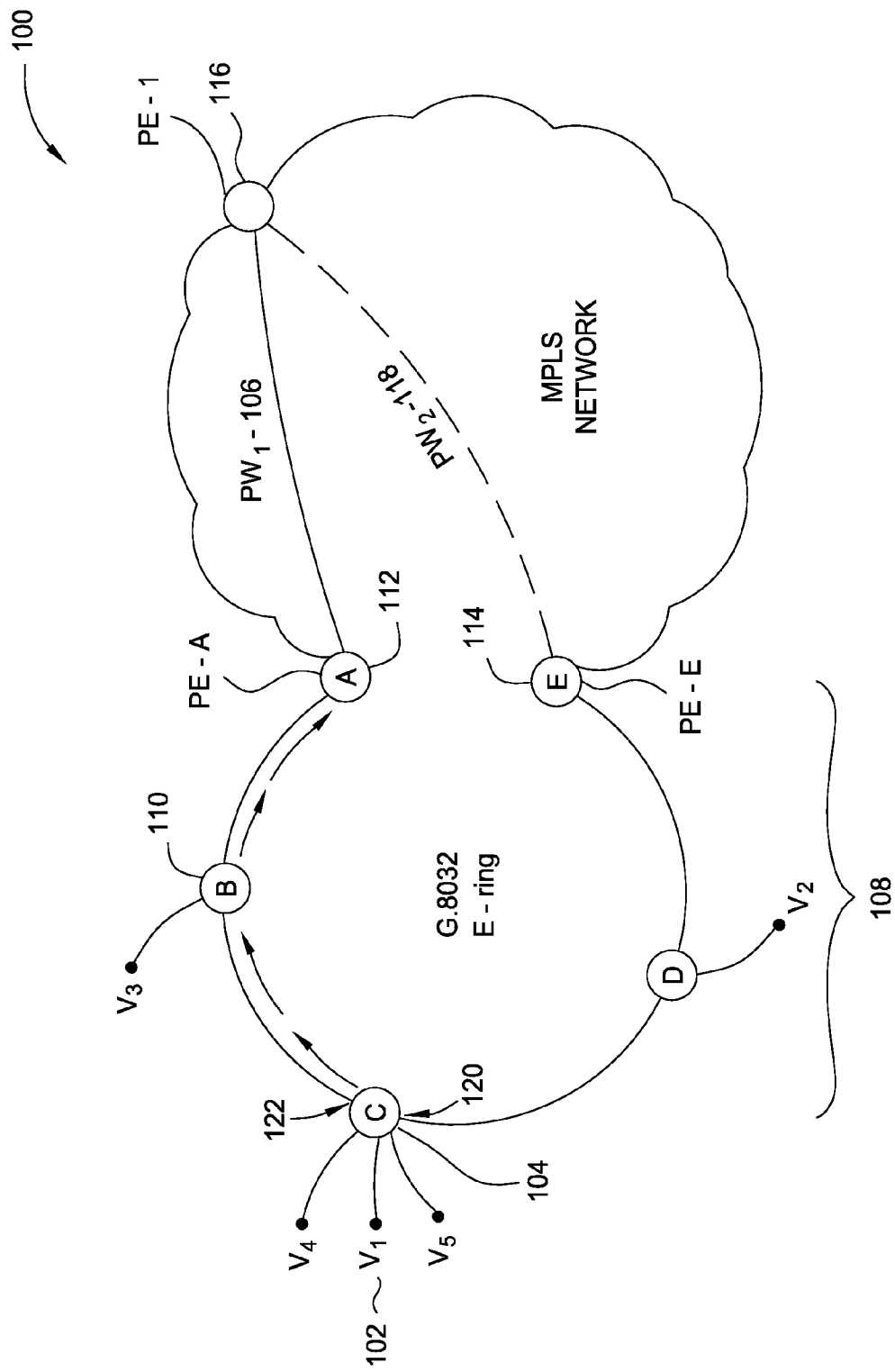
FIG. 1 illustrates an example network-computing infrastructure connecting a G.8032 access ring to a MPLS network, according to certain embodiments of the present disclosure.

FIG. 1 illustrates an example network computing infrastructure 100 connecting a G.8032 access ring 108 (E-ring) to a layer 2 multipath (L2MP) network (e.g., MPLS network). The G.8032 access ring 108 may comprise five access switches/nodes (A through E) interconnected via Ethernet links. The ring 108 may be dual-homed to a pair of PE nodes (PE-A, PE-E) offering a VPWS (E-Line) service over the MPLS network. For example, as shown, a VLAN (labeled $V_1$) is connected to a network accessed over provider edge 116

(labeled PE-1) using a VPWS (i.e., an E-Line service). In this example, a direct link connected to a port on access node 104 (labeled "C") connects V1 to the dual-homed Ethernet ring 108. Additionally, to provide the E-line service, traffic from $V_1$ is routed from access node 104 to access node 110 (labeled "B") to PE node 112 (labeled "A" or PE-A). A pseudowire 106 (labeled "$PW_1$") then connects PE node 112 to PE node 116. Should any link used to provide the E-line service between $V_1$ and PE node 116 fail, PE node 114 (labeled "PE-E") should activate pseudowire 118 (labeled $PW_2$). For example, should the link fail between access node 104 and access node 110 (i.e., the connection between node C and node B), traffic from node C should be rerouted to traverse from C to D to E, and ultimately over pseudowire $PW_2$ 118 to PE node 116. Alternatively, should the link between C and D fail, no action need to be taken (at least with respect to the E-line service between $V_1$ and the network behind PE-116).

For some embodiments, the access network may be configured as a G.8032 sub-ring without a ring automatic protection switching (R-APS) virtual-channel. In such a case, the two PE nodes (PE-A, PE-E) may be 'Interconnection Nodes' that terminate R-APS. Each access node may be designated as the 'owner' of a distinct set of VLANs. For example, node B may be the owner of $V_3$, node C may be the owner of $V_1$, $V_4$, and $V_5$, and node D may be the owner of $V_2$. The VLANs $V_1$-$V_5$ may be used for E-Line services for which the respective node may have user network interface (UNI) port(s) enabled. Therefore, a given VLAN $V_X$ may have a single 'owner' among the access nodes A-E. The PE nodes (PE-A, PE-E) may be configured with VPWS pseudowires (PWs) for these VLANs, using either 1-way or 2-way redundancy. For some embodiments, inter-chassis communication protocol (ICCP) may be run between the PE nodes for purpose of PW redundancy.

After the G.8032 initial bring-up sequence, each access node monitors of whether the ring protection link (RPL) owner is situated to its 'right' or 'left' on the ring 108. In one embodiment, this may be determined by identifying the ring port on which the node has received R-APS (no request (NR), ring blocked (RB)) messages, wherein the R-APS messages may be transmitted by the RPL owner. The RPL owner may have its port blocked for a service, and not forwarding. Further, the RPL owner may be an access node or a PE node. Note that since the access network is configured as a sub-ring without an R-APS virtual-channel, these messages arrive at each access node on a single ring port. In addition, each access node A-E may have knowledge of the service VLANs for which it is the designated 'owner.' For example, this may be determined from the UNI ports configuration since each service is configured using a single UNI port of the G.8032 access ring 108 because of the p2p nature of the service. In one embodiment, when an access node receives an R-APS (NR, RB) message from a given port, the access node may transmit a new VLAN Event message out the other ring port. Such a VLAN Event message may be propagated over the ring until it reaches a PE node. The PE node may use this message to determine which PWs it may need to activate, and the PE node may communicate to its peer PE node over ICCP in order to place the corresponding redundant PWs into standby mode.

When a failure occurs in the access ring 108, the access nodes that detected the failure may block their failed links and send R-APS (signal fail (SF)) messages. When a node receives such an R-APS (SF) message, the receiving node may perform R-APS (SF) reception processing and may execute logic to determine whether the SF came in from the side of the RPL owner or the opposite side of the ring. For the former case, no further processing may be required since the fault did not affect the path to the active PE node. In the latter case, the access node may have lost connectivity to the primary PE node. Hence, in one embodiment, the access node may transmit a 'VLAN Event' message on the other ring port (the one that did not receive SF indication) towards the PE node. This message may cause the receiving PE node to trigger a PW failover. In other words, the PE node that received the message may go active, whereas the other PE node may go into an AC fault/standby state. For some embodiments, the receiving PE node may signal the other PE node to go from an active state to a standby state.

More generally, the access nodes use the 'VLAN Event' message to signal to a PE node the need for activating its PWs for the affected VLANs. In one embodiment, the message may be encoded as a G.8032 v2 R-APS message with Request/State Field='1110'/Event, and a newly allocated sub-code. Therefore, this message may be transmitted in parallel with other R-APS transmissions on the ring 108. Given that R-APS messages all follow a 'snoop and forward' paradigm, the VLAN Event message may be relayed in the HW data-path by all access switches until it reaches the PE node. Doing so may result in minimal latency for the message to reach the PE node. Further, the message may include a new type-length-value (TLV) that encodes the affected VLANs that the transmitting node wishes to activate their corresponding PWs on the receiving PE node. The logic by which the transmitting access node determines this VLAN 'notify set' may comprise the access node first identifying the VLAN pool affected by a given R-APS message by examining its VLAN to Ethernet ring protection (ERP) instance mapping (which may be configured on all G.8032 participants). Then, the intersection of this VLAN pool with the subset of VLANs that the access node 'owns' may comprise the 'notify set'.

Figure 2:
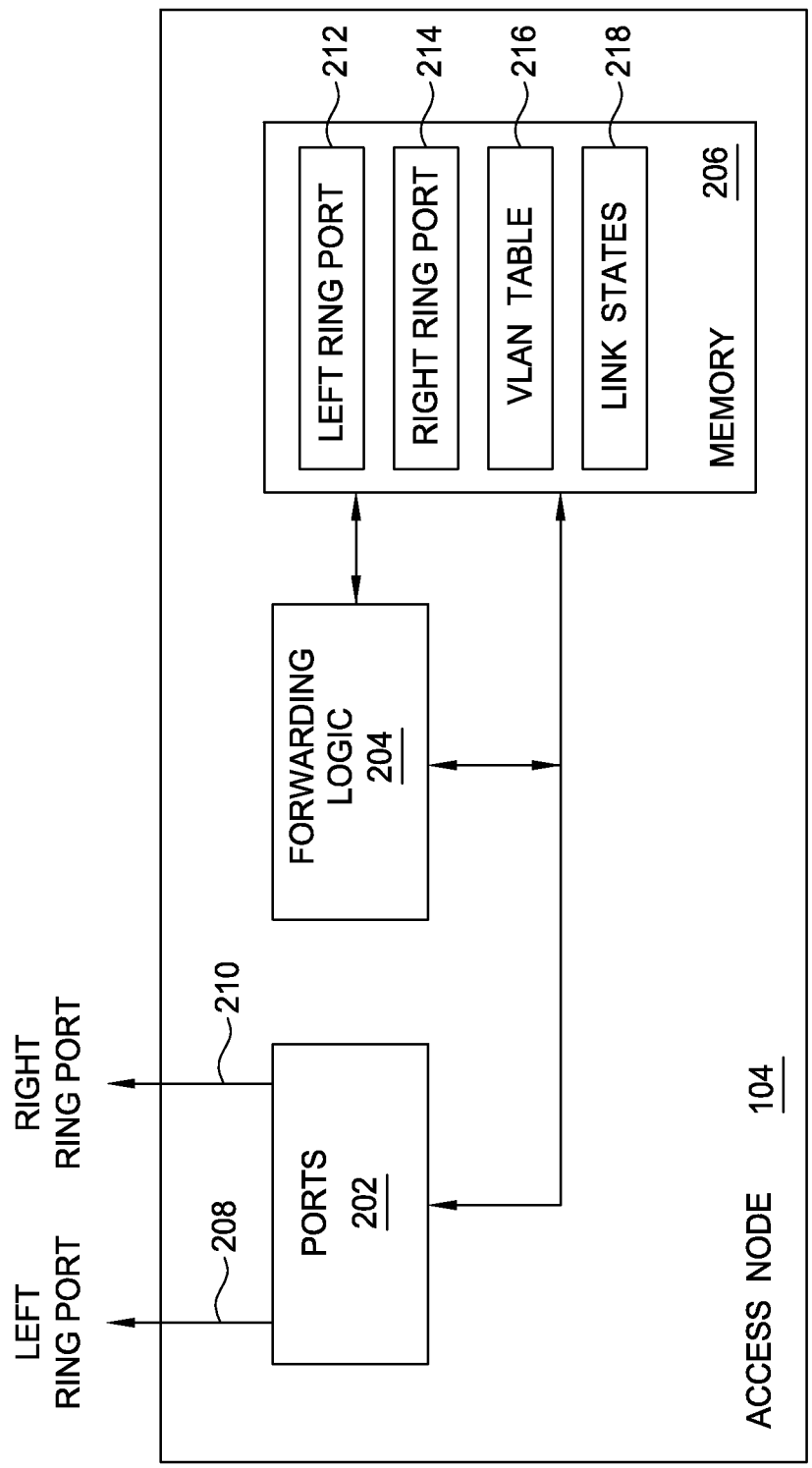
FIG. 2 is a block diagram illustrating an example of an access node, according to certain embodiments of the present disclosure.

FIG. 2 is a block diagram illustrating an example of an access node (e.g., node C 104), according to certain embodiments of the present disclosure. As shown in FIG. 2, the access node 104 comprises ports 202, a central processing unit (CPU)/forwarding logic 204, and memory 206. One of ordinary skill in the art will recognize that the depiction of the access node 104 shown in FIG. 2 is simplified to highlight aspects of the embodiments described herein and further, that, in practice the access node 104 may be configured with a variety of additional functions, features, and components.

In this example, ports 202 may comprise a left ring port 208 and a right ring port 210. The left and right ring ports 208, 210 correspond to alternative directions around the ring, each toward a different PE node, and not necessarily to being physically right or left of the access node 104. The ring ports of each node illustrated in FIG. 1 may be interconnected via Ethernet links. The forwarding logic 204 is generally configured to evaluate network packets received over one of the ports 202 and selectively forward the packets over one or more other ports on the access node 104. As shown, the memory 206 includes a variety of structures used by the forwarding logic 204 to make a forwarding decision. Illustratively, the memory 206 comprises a left ring port status 212, a right ring port status 214, a VLAN table 216, and link states 218. The left ring port status 212 and right ring port status 214 may comprise information relating to whether the RPL owner is situated to the "right" or "left" of the access node on the access ring 108, as will be described further herein. The VLAN table 216 may comprise information relating to which VLANs the access node 104 may be an owner. The link states 218 may comprise information relating to connectivity with the active PE node.

Figure 3:
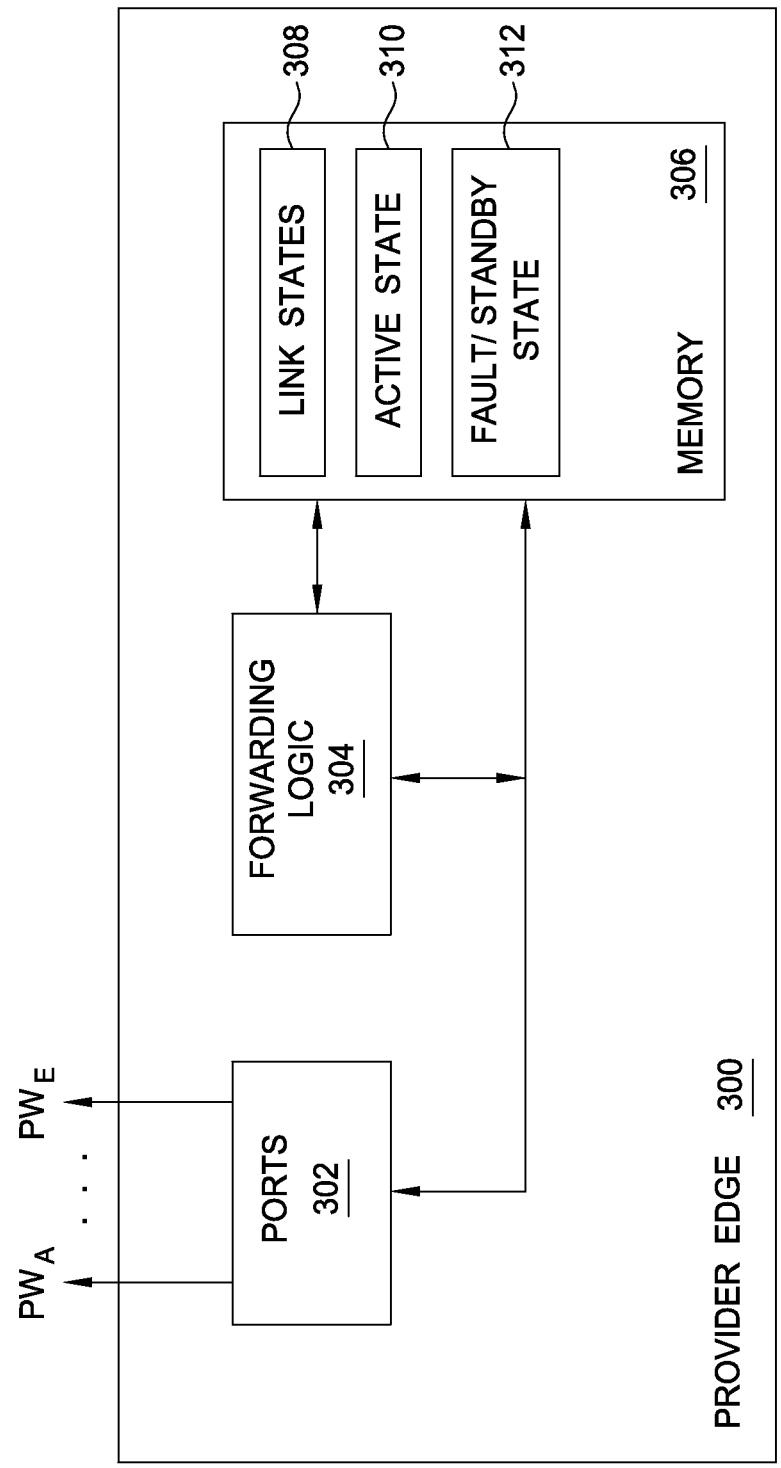
FIG. 3 is a block diagram illustrating an example of a provider edge (PE) node, according to certain embodiments of the present disclosure.

FIG. 3 is a block diagram illustrating an example of a PE node 300 (e.g., PE-A and PE-E), according to certain embodiments of the present disclosure. As shown in FIG. 3, the PE node 300 comprises ports 302, a central processing unit (CPU)/forwarding logic 304, and memory 306. One of ordinary skill in the art will recognize that the depiction of the PE node 300 shown in FIG. 3 is simplified to highlight aspects of the embodiments described herein and further, that, in practice the PE node 300 may be configured with a variety of additional functions, features, and components.

In this example, ports 302 may comprise ports used to provide a pseudowire for each virtual private wire service (labeled $PW_A \ldots PW_E$). Thus, the pseudowires for a particular VPWS connection may be in a forwarding state or standby state, depending whether the PE node 300 is in an active state or standby state, as described in detail below. For now, note that each VPWS connection, once established, includes an active pseudowire on one provider edge of a dual-homed Ethernet, and a pseudowire in a standby status on the other provider edge. The ports 302 may further comprise a ring port for connecting the PE node 300 to the access ring 108. The forwarding logic 304 is generally configured to evaluate network packets received over one of the ports 302 and selectively forward the packets over one or more other ports on the PE node 300. As shown, the memory 306 includes a variety of structures used by the forwarding logic 304 to make a forwarding decision. Illustratively, the memory 306 comprises a link states table 308, an active state indicator 310, and a fault/standby state 312. The link states table 308 may comprise information relating to whether a ring failure has resulted in a loss of connectivity with an access node. The active state indicator 310 and fault/standby state indicator 312 may comprise information relating to whether the PE node is in an active state or standby state for a particular access node.

For some embodiments, for a given service instance (e.g., VLAN), traffic from access to core may flow either clockwise or counter-clockwise over the ring 108. Consequently, one of the PE nodes (PE-A, PE-E) may be active for the service in question, whereas the other PE node may be in standby mode. As such, the active PE node may ensure that its PW (for that service) is in forwarding state, whereas the standby PE node may ensure that its PW is signaled to be in standby state. Such signaling may be done using a PW preferential forwarding status bit. For example, for the infrastructure 100, traffic may flow from clockwise over the ring 108 from VLAN $V_1$ 102, as illustrated in FIG. 1. Consequently, PE-A may be active for the service in question, whereas PE-E may be in standby mode. As such, PE-A may ensure that $PW_1$ is in a forwarding state (solid line), whereas PE-E may ensure that $PW_2$ is signaled to be in a standby state (dashed line).

For some embodiments, when the access ring 108 encounters a failure which is not directly visible to the PE nodes (PE-A, PE-E), a messaging protocol mechanism may be used to send a message to the PE node (PE-A, PE-E). In turn, the PE node may determine whether it needs to remain in its current state (for a given VPWS connection), whether active or standby. For example, considering an E-Line service from node C 104, where PE-A is the active PE node and PE-E is in standby mode, a failure of the link between nodes C and D may not affect the states of the PE nodes for this service. However, a failure of the link between nodes C and B may trigger PE-A to go into a fault/standby state whereas PE-E may take over and go into an active state for the service in question.

Figure 4:
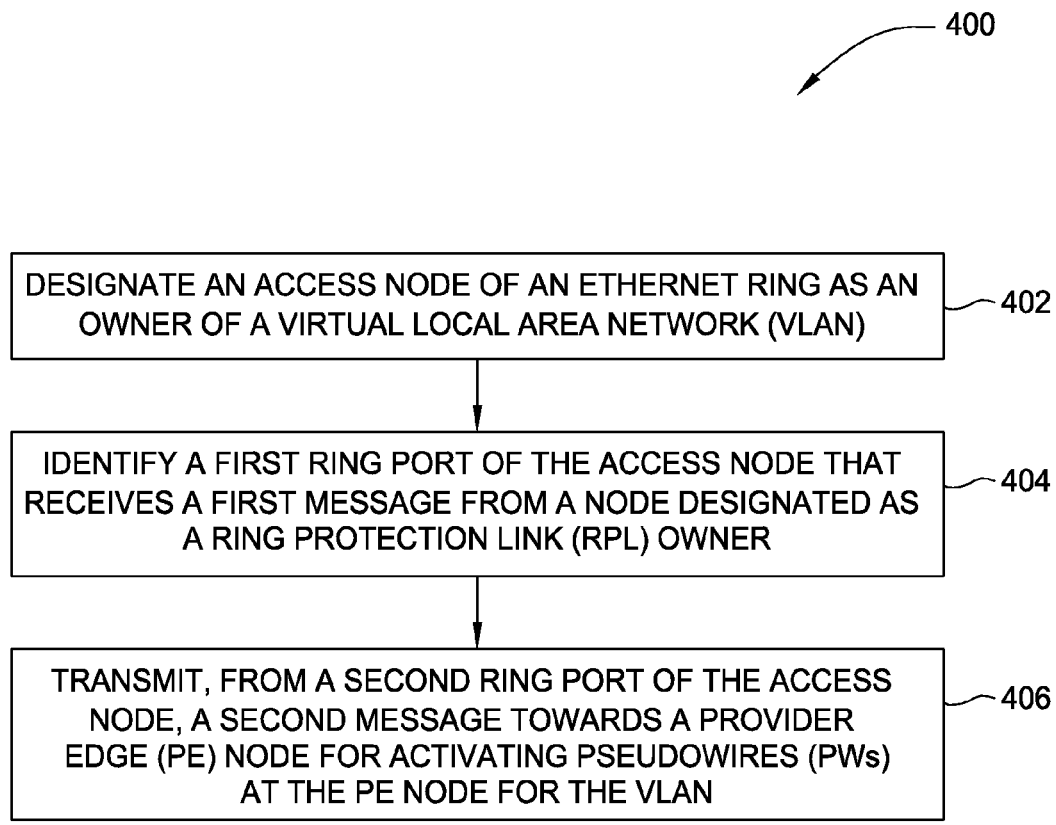
FIG. 4 illustrates a method for an access node of an Ethernet ring to notify a PE node which VLANs are active at steady-state and when all faults are cleared, according to certain embodiments of the present disclosure.

FIG. 4 illustrates a method 400 for an access node of an Ethernet ring to notify a PE node which VLANs are active at steady-state and when all faults are cleared, according to certain embodiments of the present disclosure. As shown, the method 400 begins at step 402 where an access node of an Ethernet ring (E-ring) is designated as an owner of a virtual local area network (VLAN). For example, as illustrated in FIG. 1, node C 104 of E-ring 108 may be determined to be the owner of VLAN $V_1$ 102. This may be determined from the UNI ports configuration since each service is configured using a single UNI port of the E-ring 108 because of the p2p nature of the service. At step 404, a first ring port of the access node may be identified as the ring port that receives a first message (e.g., R-APS(NR, RB)) from a node designated as a RPL owner. At step 406, a second ring port of the access node may transmit a second message (e.g., VLAN Event message) towards a PE node for activating PWs at the PE node for the VLAN. For example, node C 104 may receive an R-APS message (NR, RB) from node D, wherein node D may be designated as the RPL owner. A first ring port 120 of node C 104 may receive the R-APS message, notifying node C that the node D may be blocked for a service. Therefore, node C 104 may transmit, from a second ring port 122, a VLAN Event message towards PE-A for activating PWs at PE-A for VLAN $V_1$ 102. Therefore, the active PE (e.g., PE-A) may ensure that its PW (for that service) is in forwarding state, whereas the standby PE (e.g., PE-E) may ensure that its PW is signaled to be in standby state.

Figure 5:
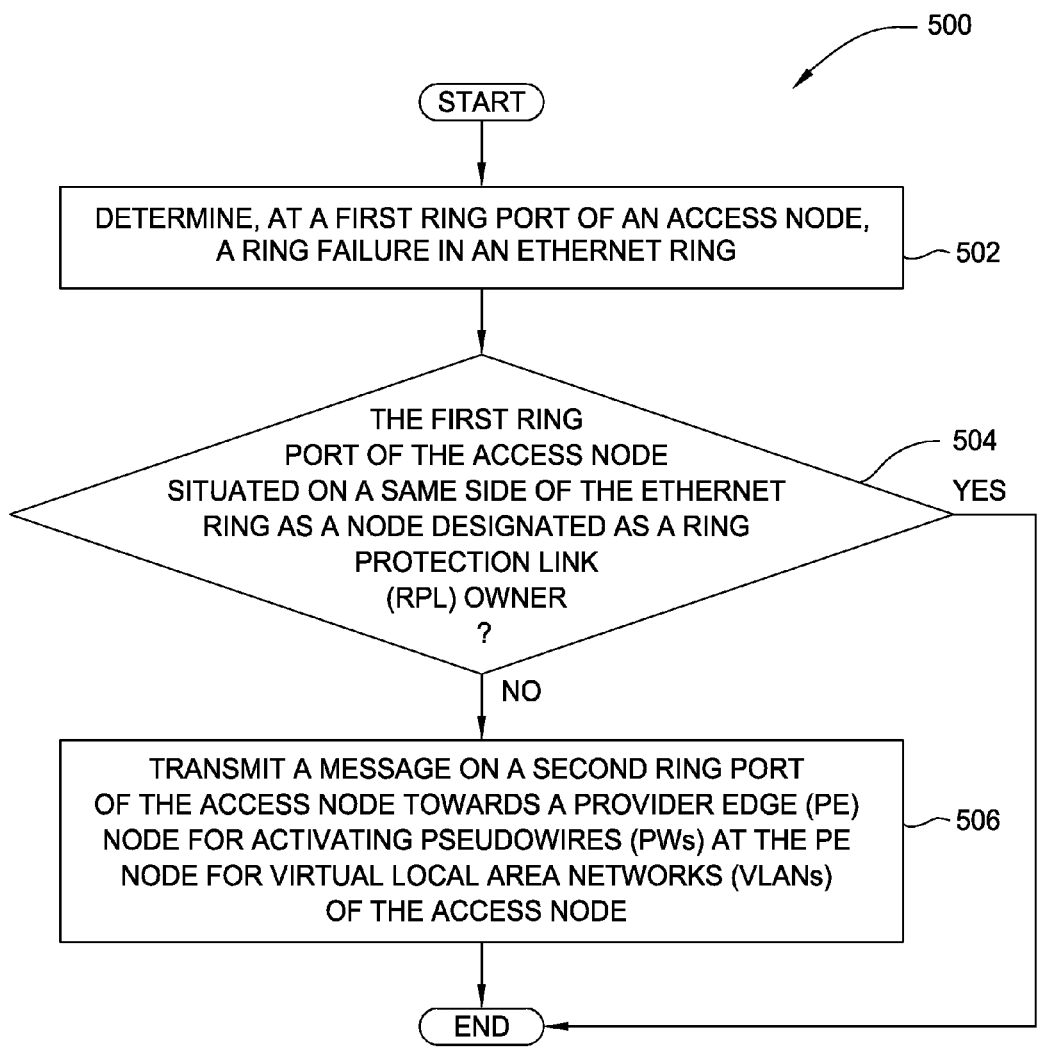
FIG. 5 illustrates a method for an access node to determine whether a ring failure in an Ethernet ring affects the path to an active PE node, according to certain embodiments of the present disclosure.

FIG. 5 illustrates a method 500 for an access node to determine whether a ring failure in an Ethernet ring affects the path to the active PE node, according to certain embodiments of the present disclosure. At step 502, an access node determines, at a first ring port of the access node, a ring failure in an Ethernet ring. For some embodiments, the access node may determine the ring failure in the Ethernet ring by receiving a message indicating the ring failure (e.g., R-APS (SF) message). For other embodiments, the access node may determine the ring failure by locally detecting a link fault. At step 504, the access node determines whether the first ring port of the access node is situated on a same side of the Ethernet ring as a node designated as a RPL owner. If the first ring port of the access node is situated on a same side of the Ethernet ring as the node designated as the RPL owner, then the failure did not affect the path to the active PE node. Otherwise, at step 506, a message (e.g., VLAN Event message) is transmitted on a second ring port of the access node towards a PE node for activating PWs at the PE node for VLANs of the access node.

Figure 6:
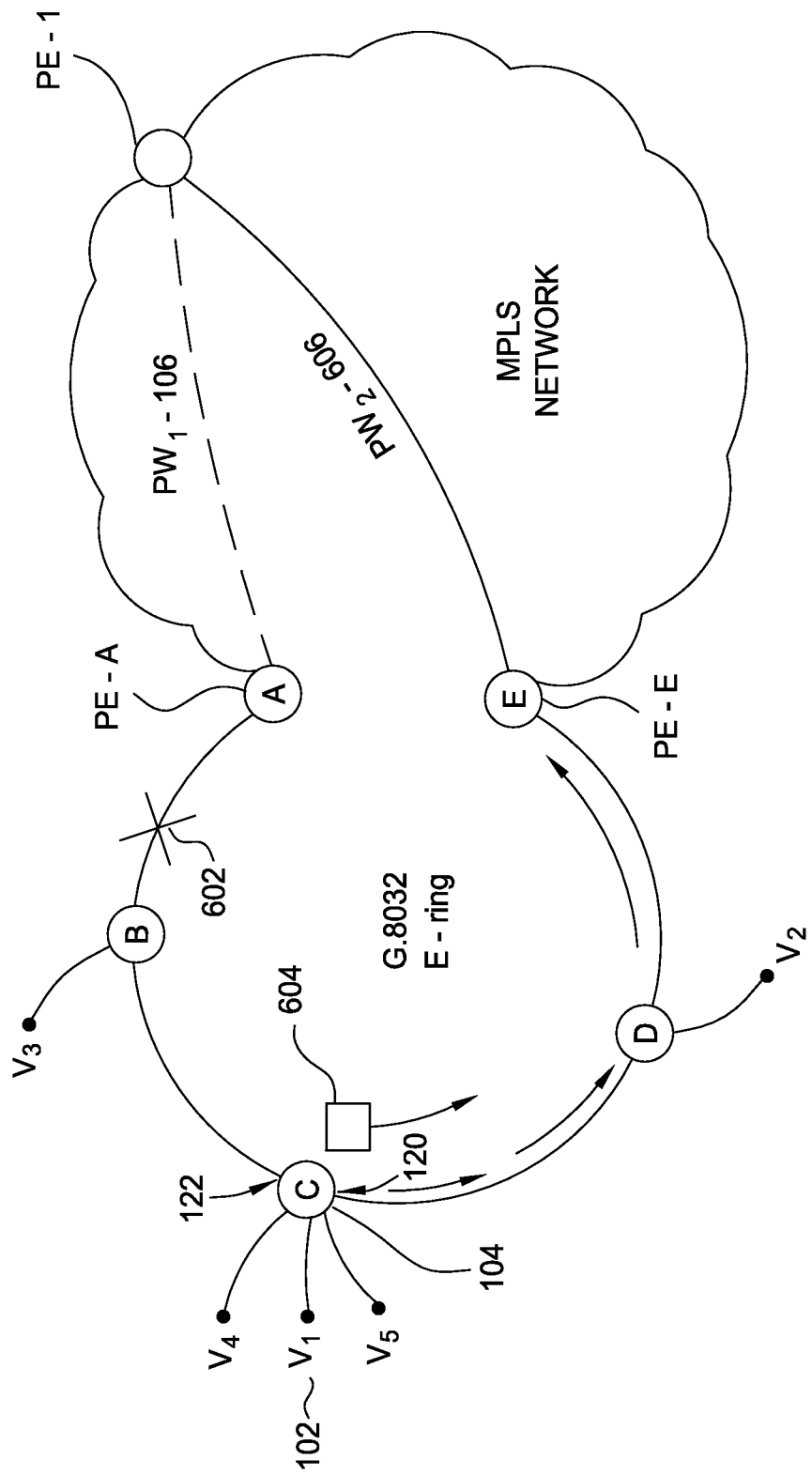
FIGS. 6-7 further illustrate the methods of FIG. 5 using an example network computing infrastructure connecting a G.8032 access ring to a layer 2 multipath (L2MP) network, according to certain embodiments of the present disclosure.
Figure 7:
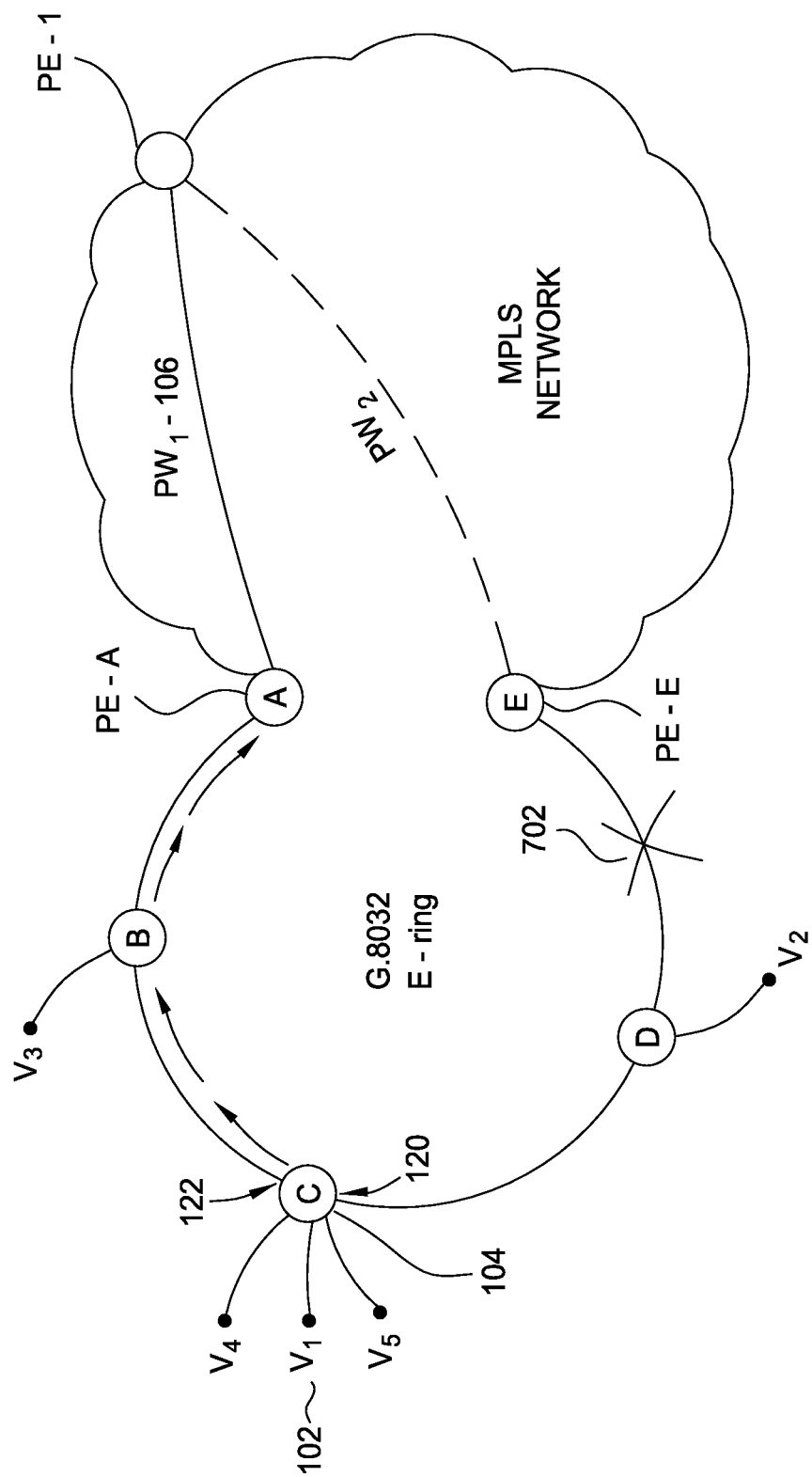

FIGS. 6-7 further illustrate steps of method 500. FIG. 6 illustrates the network computing infrastructure 100 of FIG. 1, wherein Node D may by the RPL owner and PE-A may be the active PE node for VLAN $V_1$ of node C. FIG. 6 further illustrates that a link failure 602 occurs between node B and node A. At 502, Node C 104 receives, at port 122, a R-APS (SF) message from node B indicating a ring failure in the E-ring 108. At 504, Node C will determine whether the R-APS (SF) message was received on the same port Node C originally received the R-APS (NR, RB) message. With Node D as the RPL owner, Node C would have received the R-APS (NR, RB) message at port 120; therefore, since the R-APS messages were received at different ports on Node C, Node C may transmit a VLAN Event message 604 on port 120 for activating PWs at PE-E for VLAN $V_1$. In other words, since the failure 602 occurred between ring port 122 of node C 104 and the active PE node (PE-A), traffic flowing from VLAN $V_1$ 102 to PE-A may be affected, wherein node C may transmit VLAN Event message 604 to standby PE node (i.e., PE-E) for activating $PW_2$ 606.

FIG. 7 illustrates a link failure occurring between node D and node E. At 502, Node C 104 receives, at port 120, a R-APS (SF) message from node D indicating a ring failure in the E-ring 108. At 504, Node C will determine whether the R-APS (SF) message was received on the same port Node C originally received the R-APS (NR, RB) message. With Node D as the RPL owner, Node C would have received the R-APS (NR, RB) message at port 120; therefore, since the R-APS messages were received at the same port on Node C, traffic flowing from VLAN 102 to PE-A may not be affected, so PE-A may remain the active PE node.

Given that the R-APS 'VLAN Event' messages follow a 'snoop and forward' paradigm, this solution may outperform MVRP in terms of convergence time. Thus, it may meet the 50 msec failover time requirement. The service may be configured as VPWS on the PE nodes, thereby providing better scalability and eliminating the need for MAC learning (as required in the VPLS workaround). The service may provide a single protocol solution, where all functionality is self-contained within G.8032, and the service provider may not need to run an overlay of control protocols for resiliency/redundancy MVRP over G.8032).

While the forgoing is directed to exemplary embodiments, other and further embodiments may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A method, comprising:
determining, at a first ring port of a first access node, a ring failure in an Ethernet ring disrupting a connection to a first set of pseudowires (PWs) at a first provider edge (PE) node; and
upon determining the first ring port of the first access node is not situated on a same side of the Ethernet ring as a node designated as a ring protection link (RPL) owner, transmitting a message on a second ring port of the first access node towards a second PE node for activating a second set of PWs at the second PE node for virtual local area networks (VLANs) of the first access node, wherein the message comprises a type-length-value (TLV) that encodes the VLANs of the first access node for activating the second set of PWs at the second PE node.

2. The method of claim 1, further comprising:
designating the first access node of the Ethernet ring as an owner of the VLANs; and
identifying the second ring port of the first access node that receives a message from the node designated as the RPL owner.

3. The method of claim 2, wherein identifying the second ring port comprises activating the second set of PWs at the second PE node for the VLANs of the first access node.

4. The method of claim 1, wherein determining the ring failure in the Ethernet ring comprises receiving a message indicating the ring failure.

5. The method of claim 1, wherein determining the ring failure in the Ethernet ring comprises locally detecting a link fault.

6. The method of claim 1, further comprising the second PE node signaling another PE node to go from an active state to a standby state.

7. A non-transitory computer-readable storage medium storing code for execution by a central processing unit (CPU), wherein the code, when executed by the CPU, performs an operation, the operation comprising:
determining, at a first ring port of a first access node, a ring failure in an Ethernet ring disrupting a connection to a first set of pseudowires (PWs) at a first provider edge (PE) node; and
upon determining the first ring port of the first access node is not situated on a same side of the Ethernet ring as a node designated as a ring protection link (RPL) owner, transmitting a message on a second ring port of the first access node towards a second PE node for activating a second set of PWs at the second PE node for virtual local area networks (VLANs) of the first access node, wherein the message comprises a type-length-value (TLV) that encodes the VLANs of the first access node for activating the second set of PWs at the second PE node.

8. The computer-readable storage medium of claim 7, wherein the operation further comprises:
designating the first access node of the Ethernet ring as an owner of the VLANs; and
identifying the second ring port of the first access node that receives a message from the node designated as the RPL owner.

9. The computer-readable storage medium of claim 8, wherein identifying the second ring port comprises activating the second set of PWs at the second PE node for the VLANs of the first access node.

10. The computer-readable storage medium of claim 7, wherein determining the ring failure in the Ethernet ring comprises receiving a message indicating the ring failure.

11. The computer-readable storage medium of claim 7, wherein determining the ring failure in the Ethernet ring comprises locally detecting a link fault.

12. The computer-readable storage medium of claim 7, wherein the operation further comprises the second PE node signaling another PE node to go from an active state to a standby state.

13. A first switching device, comprising:
a processor; and
a memory storing an application configured to perform an operation for processing network data, the operation comprising:
determining, at a first ring port of the first switching device, a ring failure in an Ethernet ring disrupting a connection to a first set of pseudowires (PWs) at a first provider edge (PE) node; and
upon determining the first ring port of the first switching device is not situated on a same side of the Ethernet ring as a node designated as a ring protection link (RPL) owner, transmitting a message on a second ring port of the first switching device towards a second PE node for activating a second set of PWs at the second PE node for virtual local area networks (VLANs) of the first switching device, wherein the message comprises a type-length-value (TLV) that encodes the VLANs of the first access node for activating the second set of PWs at the second PE node.

14. The system of claim 13, wherein the operation of the first switching device further comprises:
   designating the first switching device of the Ethernet ring as an owner of the VLANs; and
   identifying the second ring port of the first switching device that receives a message from the node designated as the RPL owner.

15. The system of claim 14, wherein identifying the second ring port comprises activating the second set of PWs at the second PE node for the VLANs of the first switching device.

16. The system of claim 13, wherein determining the ring failure in the Ethernet ring comprises receiving a message indicating the ring failure.

17. The system of claim 13, wherein determining the ring failure in the Ethernet ring comprises locally detecting a link fault.

18. The system of claim 13, wherein the operation of the first switching device further comprises the second PE node signaling another PE node to go from an active state to a standby state.

* * * * *

UNITED STATES PATENT AND TRADEMARK OFFICE
CERTIFICATE OF CORRECTION

PATENT NO. : 8,644,134 B2
APPLICATION NO. : 12/914722
DATED : February 4, 2014
INVENTOR(S) : Ali Sajassi et al.

Page 1 of 1

It is certified that error appears in the above-identified patent and that said Letters Patent is hereby corrected as shown below:

In the Specification:

Column 7, Line 7, please insert -- $V_1$ -- after VLAN;

Column 7, Line 19, please delete "MVRP over G.8032)" and insert -- (i.e., MVRP over G.8032) -- therefor.

Signed and Sealed this
Third Day of June, 2014

Michelle K. Lee
*Deputy Director of the United States Patent and Trademark Office*